(12) United States Patent
Terada

(10) Patent No.: US 11,396,157 B2
(45) Date of Patent: Jul. 26, 2022

(54) DECORATIVE SHEET

(71) Applicant: TOPPAN PRINTING CO., LTD., Tokyo (JP)

(72) Inventor: Tomohiro Terada, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 0 days.

(21) Appl. No.: 16/962,780

(22) PCT Filed: Jan. 15, 2019

(86) PCT No.: PCT/JP2019/000922
§ 371 (c)(1),
(2) Date: Jul. 16, 2020

(87) PCT Pub. No.: WO2019/142782
PCT Pub. Date: Jul. 25, 2019

(65) Prior Publication Data
US 2020/0353714 A1 Nov. 12, 2020

(30) Foreign Application Priority Data
Jan. 22, 2018 (JP) .............................. JP2018-008077

(51) Int. Cl.
*B32B 3/30* (2006.01)
*B32B 7/022* (2019.01)
*B32B 27/08* (2006.01)

(52) U.S. Cl.
CPC .............. *B32B 3/30* (2013.01); *B32B 7/022* (2019.01); *B32B 27/08* (2013.01);
(Continued)

(58) Field of Classification Search
CPC .............. B32B 3/30; B32B 2307/412; B32B 2307/732; B32B 2405/00; B32B 2451/00;
(Continued)

(56) References Cited

FOREIGN PATENT DOCUMENTS

| JP | H05-278400 A | 10/1993 |
|---|---|---|
| JP | H 06238751 A | 8/1994 |

(Continued)

OTHER PUBLICATIONS

International Preliminary Report on Patentability, for International Application No. PCT/JP2019/000922, with translation, dated Aug. 6, 2020, 15 pages.

(Continued)

*Primary Examiner* — Yan Lan
(74) *Attorney, Agent, or Firm* — Squire Patton Boggs (US) LLP

(57) ABSTRACT

There is provided a decorative sheet having a three-dimensional effect by a tactile sense and a visual three-dimensional effect or texture and excellent in design properties. A decorative sheet (10) according to this embodiment is provided with a base material (1), an image design layer (2) provided on a front surface (1a) side of the base material (1), a transparent adhesive layer (3) provided on a front surface (2a) side of the image design layer (2), a transparent thermoplastic resin layer (4) provided on a front surface (3a) side of the transparent adhesive layer (3), and a surface protective layer (5) provided on a front surface (4a) side of the transparent thermoplastic resin layer (4). On a front surface (5c) side of the surface protective layer (5), a recess and projection design (8) and a recess and projection pattern (9) having a plurality of regions (9a, 9b, 9c) which is provided on each of the surfaces of recess portions and the surfaces of projection portions of the recess and projection design (8) and in which recesses and projections are formed are provided. A height difference between the recess portions and the projection portions of the recess and projection design (8) is 3 μm or more and 200 μm or less. A height difference between recess portions and projection portions in each of the regions (9a, 9b, 9c) of the recess and projection (Continued)

pattern 9 is smaller than the height difference between the recess portions and the projection portions of the recess and projection design (8).

7 Claims, 1 Drawing Sheet

(52) U.S. Cl.
CPC ... *B32B 2307/412* (2013.01); *B32B 2307/732* (2013.01); *B32B 2405/00* (2013.01); *B32B 2451/00* (2013.01)

(58) Field of Classification Search
CPC ......... B32B 27/00; B32B 27/08; B32B 27/40; B32B 7/022; B32B 7/023; B32B 7/12; B32B 2255/10; B32B 2255/26; B32B 2307/4023; B32B 2307/406; B32B 2307/54; B32B 2307/584; B32B 27/32; B32B 2037/243; B32B 37/24
See application file for complete search history.

(56) References Cited

FOREIGN PATENT DOCUMENTS

| | | |
|---|---|---|
| JP | H 0811207 A | 1/1996 |
| JP | H 11147399 A | 6/1999 |
| JP | 2012-192743 A | 10/2012 |
| JP | 2013-226840 A | 11/2013 |
| JP | 2014-069507 A | 4/2014 |
| JP | 2017-144599 A | 8/2017 |

OTHER PUBLICATIONS

Extended European Search Report for European Application No. 19741227.3 dated Sep. 16, 2021, 6 pages.

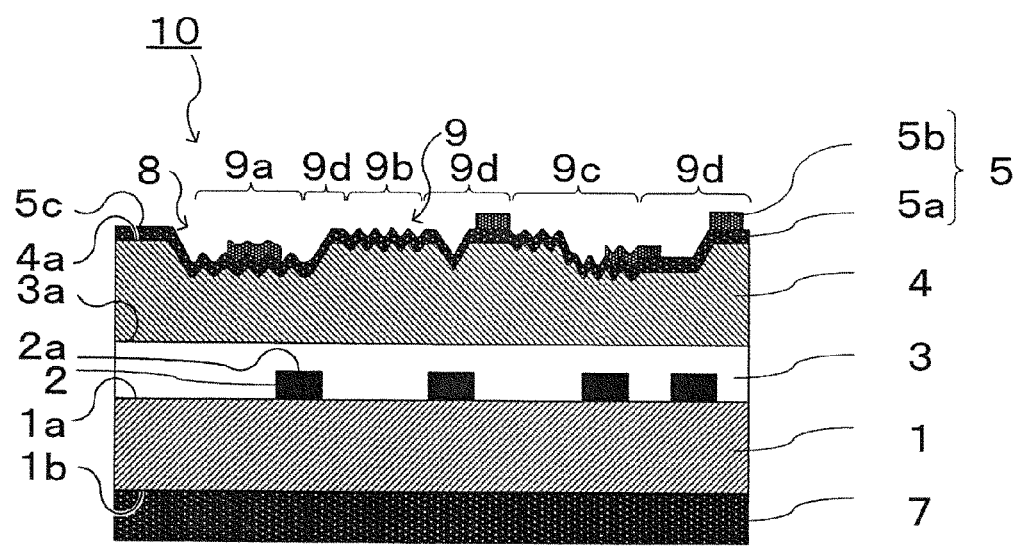

DECORATIVE SHEET

CROSS-REFERENCE TO RELATED APPLICATIONS

This application is a National Stage filing under 35 U.S.C. § 371 of International Patent Application No. PCT/JP2019/000922, filed Jan. 15, 2019, which claims the benefit of priority to JP Application No. 2018-008077, filed Jan. 22, 2018, both applications which are incorporated herein by reference in their entirety for all purposes.

TECHNICAL FIELD

The present invention relates to a decorative sheet.

BACKGROUND ART

Conventionally, as decorative sheets, a decorative sheet is mentioned, for example, in which a recess and projection design by emboss processing in accordance with an image of an image design layer is formed on the outermost layer and which gives a three-dimensional effect by a tactile sense (for example, see PTL 1). Moreover, a decorative sheet is mentioned, for example, in which a gloss design by printing in accordance with an image of an image design layer is formed on the outermost layer and which gives a visual three-dimensional effect or texture by contrast.

However, it has been difficult to completely make the recess and projection design by emboss processing and the gloss design by printing coincide with the image of the image design layer in terms of dimensional stability in sheet processing and the like. Therefore, in general, the design expression of the decorative sheet has been improved using a design having roughness and fineness/flow direction approximately similar to that of the image of the image design layer as the recess and projection design or the gloss design.

Moreover, for example, there has been a possibility that, when the recess and projection design by emboss processing and the gloss design by printing are combined, the recess and projection design and the gloss design are deviated from each other, so that the design properties decrease.

CITATION LIST

Patent Literature

PTL 1: JP 2012-192743 A

SUMMARY OF INVENTION

Technical Problem

The present invention has been made in view of the above-described problems. It is an object of the present invention to provide a decorative sheet having a three-dimensional effect by a tactile sense and a visual three-dimensional effect or texture and excellent in design properties.

Solution to Problem

In order to solve the above-described problems, one aspect of the present invention is a decorative sheet provided with (a) a base material, (b) an image design layer provided on the front surface side of the base material, (c) a transparent adhesive layer provided on the front surface side of the image design layer, (d) a transparent thermoplastic resin layer provided on the front surface side of the transparent adhesive layer, and (e) a surface protective layer provided on the front surface side of the transparent thermoplastic resin layer, in which (f), on the front surface side of the surface protective layer, a recess and projection design and a recess and projection pattern having a plurality of regions provided on each of the surfaces of recess portions and the surfaces of projection portions of the recess and projection design and in which recesses and projections are formed, (g) a height difference between the recess portions and the projection portions of the recess and projection design is 3 µm or more and 200 µm or less, and (h) a height difference between recess portions and projection portions in each of the regions of the recess and projection pattern is smaller than the height difference between the recess portions and the projection portions of the recess and projection design.

Advantageous Effects of Invention

According to the present invention, the recess and projection design is provided on the outermost surface and the height difference between the recess portions and the projection portions of the recess and projection design is 3 µm or more and 200 µm or less, and therefore a three-dimensional effect can be given by a tactile sense due to the recess portions and projection portions of the recess and projection design. Moreover, the recess and projection pattern having the plurality of regions where the recesses and the projections are formed is provided on the surfaces of the recess portions and the projection portions of the recess and projection design and the height difference between the recess portions and the projection portions in each of the regions of the recess and projection pattern is smaller than the height difference between the recess portions and the projection portions of the recess and projection design, and therefore a gloss contrast is provided in the inside and the outside of the regions and a gloss design pattern is provided, so that a visual three-dimensional effect or texture can be given.

Moreover, the recess and projection design and the recess and projection pattern can be simultaneously formed with one shaping plate. The simultaneous formation of the recess and projection design and the recess and projection pattern with the shaping plate can make the recess and projection design and the gloss design coincide with each other. Thus, a decorative sheet can be provided which has a three-dimensional effect by a tactile sense and a visual three-dimensional effect or texture and excellent in design properties.

BRIEF DESCRIPTION OF DRAWINGS

FIG. 1 is a cross-sectional view illustrating a decorative sheet according to an embodiment of the present invention.

DESCRIPTION OF EMBODIMENTS

Hereinafter, a decorative sheet according to an embodiment of the present invention is described with reference to the drawings. In the description of the drawings, the same or similar portions are designated by the same or reference numerals, so that duplicated descriptions about substantially the same configurations and the like are omitted in the description of the decorative sheet. The present invention is not limited to the following embodiment and can be modified, such as alternations of the design, based on knowledges of persons skilled in the art. Embodiments to which such modifications are given are also included in the scope of the present invention. The drawings are illustrated in an exaggerated manner as appropriate for ease of understanding.

Configuration

In a decorative sheet 10 according to the embodiment of the present invention, an image design layer 2, a transparent adhesive layer 3, a transparent thermoplastic resin layer 4, and a surface protective layer 5 are laminated on the side of a front surface 1a of a base material 1 in this order as illustrated in FIG. 1. The surface protective layer 5 serves as the outermost layer. On the side of a back surface 1b of the base material 1, a back surface resin coat layer 7 is provided. On the side of a front surface 4a of the transparent thermoplastic resin layer 4 and the side of a front surface 5c of the surface protective layer 5, a recess and projection design 8 by emboss processing is provided.

Base Material

The base material 1 is a sheet-like layer containing resin. As the resin, a colored thermoplastic resin is usable, for example. As the thermoplastic resin, a vinyl chloride resin, an acrylic resin, and a polyolefin resin (a polypropylene resin, a polyethylene resin, and the like) can be adopted, for example. In particular, the polyolefin resin is preferable in terms of the environmental compatibility, the processability, and the price. The grade or the composition of the resin can be selected also in terms of ease of sheeting, printing suitability, suitability for bending processing, and the like. The colored thermoplastic resin can conceal a substrate (not illustrated) to which the decorative sheet 10 is stuck and can form a base color of the image design layer 2. The hue of the thermoplastic resin can be selected as appropriate in accordance with the base color or the like. As a method for coloring the thermoplastic resin, a method including mixing or kneading a colorant, such as pigment, with/into the thermoplastic resin in sheeting of the thermoplastic resin can be adopted, for example. Before providing the image design layer 2, a solid ink layer (colored layer) may be provided using a technology of coating or printing between the image design layer 2 and the base material 1.

Image Design Layer

The image design layer 2 is a layer provided on the front surface 1a side of the base material 1 and obtained by printing or coating of an image for giving design properties. A printing method is not particularly limited and known printing methods can be adopted. For example, a gravure printing method is preferable in terms of the productivity or the image grade. As the image, images suitable for a portion where the decorative sheet 10 is used, such as grain, cork, pebble, tile, pottery, and abstract designs, can be selected, for example. A printing ink is not particularly limited and an ink corresponding to the printing method can be selected as appropriate. For example, it is preferable to select the printing ink in terms of the contact property or the printing suitability to the base material 1 (resin) and the weatherability of decorative materials.

As necessary, an adhesive layer (not illustrated) may be provided on the image design layer 2 or the transparent adhesive layer 3 for the purpose of an improvement of the adhesiveness between the image design layer 2 and the transparent adhesive layer 3 and an improvement of the adhesiveness between the transparent adhesive layer 3 and the transparent thermoplastic resin layer 4. A resin used for the adhesive layer (not illustrated) is not particularly limited. For example, a two-component curable urethane resin and the like can be adopted. As a formation method of the adhesive layer (not illustrated), a coating device, a gravure printing device, and the like are usable, for example.

Transparent Adhesive Layer

The transparent adhesive layer 3 is a layer provided on the front surface 2a side of the image design layer 2 and strengthening the adhesion between the base material 1 and the image design layer 2, and the transparent thermoplastic resin layer 4. Due to the fact that the adhesion therebetween is firm, bending suitability following a curved surface or a right-angled surface can be given to the decorative sheet 10.

Transparent Thermoplastic Resin Layer 4

The transparent thermoplastic resin layer 4 is a layer provided on the front surface 3a side of the transparent adhesive layer 3 and giving thickness and depth in terms of the design or improving the weatherability or the wear resistant performance of the decorative sheet 10. As the thermoplastic resin, a vinyl chloride resin, an acrylic resin, and a polyolefin resin (a polypropylene resin, a polyethylene resin) can be adopted, for example. In particular, the polyolefin resin is preferable in terms of the environmental compatibility, the processability, and the price. The grade or the composition of the resin can be selected also in terms of ease of sheeting, printing suitability, suitability for bending processing. With respect to the suitability for the bending processing, it is important to select the resin considering the prevention of the occurrence of whitening or a crack in a bent portion.

Surface Protective Layer

The surface protective layer 5 is provided with a first surface protective layer 5a and a second surface protective layer 5b.

The first surface protective layer 5a is a layer provided on the front surface 4a side of the transparent thermoplastic resin layer 4 and covers the entire transparent thermoplastic resin layer 4. The first surface protective layer 5a is formed of a transparent or translucent material (resin) such that the image of the image design layer 2 can be viewed through the first surface protective layer 5a. The first surface protective layer 5a may be a single layer or a layer obtained by laminating a plurality of layers. The thickness of the first surface protective layer 5a is preferably within the range of 3 μm or more and 100 μm or less from the viewpoint of obtaining strength sufficient for completely burying the recess and projection design 8 and protecting the front surface of the transparent thermoplastic resin layer 4 without impairing a design feeling, for example. As materials of the first surface protective layer 5a, a thermosetting resin is preferable in terms of the adhesiveness to the transparent thermoplastic resin layer 4, the deformation followability of the decorative sheet 10, the abrasion resistance, and the like, for example. In particular, a thermosetting resin (binder) having a urethane bond, such as a two-component curable urethane resin, is more preferable in terms of the cost and the versatility. To the thermosetting resin, delustering agents or scratch resistant agents, such as a silica particles, may be added, for example.

When the first surface protective layer 5a is formed of a plurality of layers, the hardness of the layers may be lowered toward the front surface 4a side of the transparent thermoplastic resin layer 4. This improves the deformation followability of the decorative sheet 10. When the first surface protective layer 5a is formed of a plurality of layers, the thickness of the layers may be increased toward the front surface 4a side of the transparent thermoplastic resin layer 4. This improves the deformation followability of the decorative sheet 10.

As the two-component curable urethane resin, a urethane resin containing polyol as the main ingredient and containing isocyanate as a crosslinking agent (curing agent) is usable, for example. As the polyol, substances having two or more hydroxyl groups in the molecules are mentioned. For example, polyethylene glycol, polypropylene glycol, acrylic polyol, polyester polyol, polyether polyol, polycarbonate polyol, and polyurethane polyol, are usable.

As the isocyanate, polyvalent isocyanates having two or more isocyanate groups in the molecules are usable. For example, aromatic isocyanates, such as 2,4-tolylene diisocyanate, xylene diisocyanate, and 4,4'-diphenylmethane diisocyanate, or aliphatic (or alicyclic) isocyanates, such as 1,6-hexamethylene diisocyanate, isophorone diisocyanate, hydrogenated tolylene diisocyanate, and hydrogenated diphenylmethane diisocyanate, are usable. Moreover, adducts or polymers of the various isocyanates are usable. For example, an adduct of tolylene diisocyanate, such as tolylene diisocyanate trimer, is mentioned. Among the isocyanates above, the aliphatic (or alicyclic) isocyanates are preferable in terms that the weatherability and the thermal yellowing resistance can also be improved and 1,6-hexamethylene diisocyanate is usable, for example.

When a great importance is placed on the abrasion resistance, an ionizing radiation curable resin is preferable in terms of hardness. As the ionizing radiation curable resin, an ultraviolet curable resin is usable, for example. A (meth) acrylic resin, a silicone resin, a polyester resin, a urethane resin, an amide resin, and an epoxy resin can be adopted, for example. The use of the ultraviolet curable resin can improve the hardness of the surface protective layer 5, i.e., the outermost layer of the decorative sheet 10, and can improve the surface physical properties, such as the wear resistance, the abrasion resistance, and the solvent resistance, of the decorative sheet 10. As materials of the first surface protective layer 5a, a mixture of the thermosetting resin and the ionizing radiation curable resin may be used, for example.

The second surface protective layer 5b is a layer partially provided on the front surface 5c side of the first surface protective layer 5a and covering a part of the front surface 5c of the first surface protective layer 5a. Examples of the part of the front surface 5c of the first surface protective layer 5a include a portion facing the printing ink of the image design layer 2, for example. As materials of the second surface protective layer 5b, the same resin as that of the first surface protective layer 5a can be adopted, for example. To the second surface protective layer 5b, a filler may be added. The addition of the filler can give mechanical physical properties, such as gloss, a tactile sense, a texture, surface strength, and friction, different from those of the first surface protective layer 5a. As the filler, beads or amorphous particles of resin, such as acryl, polyolefin, and silicone, or beads or amorphous particles of inorganic substances, such as silica, alumina, and metal oxides, are usable, for example. A formation technology of the second surface protective layer 5b is not particularly limited and known printing methods are usable.

The thickness of the second surface protective layer 5b is 0.5 times or more and 1.0 times or less of the thickness of the first surface protective layer 5a, for example. Insofar as the thickness is within the numerical value range above, both the three-dimensional effect by a tactile sense and the visual three-dimensional effect or texture are improved.

Back Surface Resin Coat Layer

The back surface resin coat layer 7 is a layer provided on the back surface 1b side of the base material 1 and increasing the contact property between the base material 1 and an adhesive. For example, a two-component curable urethane resin is usable.

Recess and Projection Design

The recess and projection design 8 is a design containing recess portions and projection portions matched with the image of the image design layer 2. The recess portions and the projection portions of the recess and projection design 8 can give a three-dimensional effect by a tactile sense. A deviation between the recess and projection design 8 and the image of the image design layer 2 is preferably set within the range of 10 mm or less in the longitudinal direction with respect to the shape of the image design and 3 mm or less in the lateral direction (width direction), for example. For example, when the image design is grain, a direction where a conducting vessel of the grain extends serves as the "longitudinal direction with respect to the shape of the image design" and a direction orthogonal to the longitudinal direction serves as the "lateral direction with respect to the shape of the image design". In particular, when the conducting vessel of the grain extends along the longitudinal direction of the decorative sheet 10, the longitudinal direction of the decorative sheet 10 serves as a "longitudinal direction with respect to the shape of the image design" and the lateral direction (width direction) of the decorative sheet 10 serves as a "lateral direction with respect to the shape of the image design". Since the transparent thermoplastic resin layer 4 and the transparent surface protective layer 5 are transparent, the recess and projection design 8 is first strongly visually recognized by the reflection of oblique light. However, when the deviation between the recess and projection design 8 and the image of the image design layer 2 is within the range above, it is difficult to visually recognize transmission light of the image design layer 2 simultaneously with the reflected light, and thus no sense of incompatibility is given. By suppressing the deviation between the recess and projection design 8 and the image of the image design layer 2 within a fixed range, the decorative sheet 10 can be obtained in which the shapes and the distributions of the pattern are equally made to coincide with each other with good accuracy over the entire sheet surface. A height difference between the recess portions and the projection portions of the recess and projection design 8 is set within the range of 3 μm or more and 200 μm or less. As the height difference, a numerical value suitable for the design of the decorative sheet 10 to be targeted can be selected. For example, a continuous multistage shape can also be taken within the maximum height difference (200 μm). In particular, in order to obtain the shape as a macroscopic three-dimensional object, the height difference is more preferably within the range of 10 μm or more and 150 μm or less. Herein, the "height difference" refers to a distance from the lowest position in the recess portions of the recess and projection design 8 to the highest position in the projection portions of the recess and projection design 8. When the height difference between the recess portions and the projection portions of the recess and projection design 8 is expressed by an arithmetic average roughness (Ra), the value is within the range of 3 μm or more and 200 μm or less, for example.

On each of the surfaces of the recess portions and the surfaces of the projection portions of the recess and projection design 8, a recess and projection pattern 9 having a plurality of regions 9a, 9b, 9c in which recesses and projections are formed is provided. The region 9a is a region formed on the surfaces of the projection portions of the recess and projection design 8. The region 9b is a region formed on the surfaces of the recess portions of the recess and projection design 8. The region 9c is a region formed ranging across the surfaces of the recess portions and the surfaces of the projection portions of the recess and projection design 8. Moreover, the recess and projection pattern 9 has regions 9d having no recesses and projections in addition to the regions 9a, 9b, 9c. The regions 9a, 9b, 9c have various surface roughnesses and form a gloss design and a texture matched with the image of the image design layer 2 together with gloss outside the regions 9a, 9b, 9c. A gloss difference between gloss inside the regions 9a, 9b, 9c and the gloss outside the regions 9a, 9b, 9c (i.e., regions 9d) is preferably set within the range of 3 or more and 30 or less in terms of the 60° specular gloss based on JIS Z 8741 from the viewpoint of obtaining the decorative sheet 10 significant as the design. A height difference between the recess portions and the projection portions in each of the regions 9a, 9b, 9c is made smaller than the height difference between the recess portions and the projection portions of the recess and projection design 8. In particular, the height difference between the recess portions and the projection portion in each of the regions 9a, 9b, 9c is preferably 0.5 μm or more and 10 μm or less.

Even in the case of the 60° specular gloss based on ISO 2813 in place of "JIS Z 8741" described above, the gloss difference is preferably set within the range of 3 or more 30 or less. Even in the case of the 60° specular gloss based on ISO 7668, the gloss difference is preferably set within the range of 3 or more and 30 or less.

The height difference between the recess portions and the projection portions of the recess and projection design 8 may be within the range of 10 times or more and 15 times or less of the height difference between the recess portions and the projection portions in each of the regions 9a, 9b, 9c. In the case of the numerical range above, both the three-dimensional effect by a tactile sense and the visual three-dimensional effect or texture are improved.

As a formation technology of the recess and projection pattern 9, a method including forming the shape simultaneously with the recess and projection design 8 with one shaping plate (embossing plate). The simultaneous shaping of the recess and projection pattern 9 and the recess and projection design 8 with one shaping plate can completely make the recess and projection design 8 and the gloss design coincide with each other (matched). The shaping of the recess and projection pattern 9, the recess and projection design 8, and the regions 9a, 9b, 9c may be performed to the transparent thermoplastic resin layer 4 before providing the first surface protective layer 5a and the second surface protective layer 5b or may be performed to the surface protective layer 5 and the transparent thermoplastic resin layer 4 after providing the first surface protective layer 5a and the second surface protective layer 5b (surface protective layer 5), for example. When the recess and projection pattern 9 and the recess and projection design 8 are shaped after providing the surface protective layer 5, a problem can be avoided that the shape is buried and hidden by the thickness of the surface protective layer 5 or it is difficult to form the surface protective layer 5 in the recess portions due to the height difference between the recess portions and the projection portions of the recess and projection design 8, and therefore the shape of the shaping plate (pressing die) can be more finely transferred.

As the shaping plate, a roll shape is preferably used in terms of continuous processing. A formation technology of the recess and projection design 8 and the recess and projection pattern 9 of the surface of the shaping plate is not particularly limited and known platemaking technologies are usable. For example, die press etching, multiple step mask chemical etching, mechanical engraving, laser engraving, full or partial sandblasting, partial polishing, and the like can be adopted in combination.

FIG. 1 illustrates a case where the recess and projection design 8 is formed only in the transparent thermoplastic resin layer 4 and the surface protective layer 5 but this embodiment is not limited thereto. For example, the recess and projection design 8 may be formed in the base material 1, the image design layer 2, the transparent adhesive layer 3, the transparent thermoplastic resin layer 4, and the surface protective layer 5. In the case of the above-described aspect, the three-dimensional effect by a tactile sense is further improved and a gloss contrast is further enhanced, and therefore the visual three-dimensional effect or texture is further improved.

Effects of this Embodiment

The invention according to this embodiment exhibits the following effects.

(1) The decorative sheet 10 according to this embodiment is provided with the base material 1, the image design layer 2 provided on the front surface 1a side of the base material 1, the transparent adhesive layer 3 provided on the front surface 2a side of the image design layer 2, the transparent thermoplastic resin layer 4 provided on the front surface 3a side of the transparent adhesive layer 3, and the surface protective layer 5 provided on the front surface 4a side of the transparent thermoplastic resin layer 4. On the front surface 5c side of the surface protective layer 5, the recess and projection design 8 and the recess and projection pattern 9 having the plurality of regions 9a, 9b, 9c which is provided on each of the surfaces of the recess portions and the surfaces of the projection portions of the recess and projection design 8 and in which the recesses and the projections are formed. The height difference between the recess portions and the projection portions of the recess and projection design 8 is set to 3 μm or more and 200 μm or less. The height difference between the recess portions and the projection portions in each of the regions 9a, 9b, 9c of the recess and projection pattern 9 is made smaller than the height difference between the recess portions and the projection portions of the recess and projection design 8.

Hence, due to the fact that the recess and projection design 8 is provided on the outermost surface and the height difference between the recess portions and the projection portions of the recess and projection design 8 is 3 μm or more and 200 μm or less, the three-dimensional effect by a tactile sense can be given by the recess portions and projection portions of the recess and projection design 8. Moreover, the recess and projection pattern 9 is provided on the surfaces of the recess portions and the projection portions of the recess and projection design 8 and the height difference between the recess portions and the projection portions in each of the regions 9a, 9b, 9c of the recess and projection pattern 9 is smaller than the height difference between the recess portions and the projection portions of the recess and projection design 8, and therefore the gloss contrast can be provided in the inside and the outside of the regions 9a, 9b, 9c and the pattern of the gloss design can be provided, so that the visual three-dimensional effect or texture can be given.

Moreover, the recess and projection design 8 and the recess and projection pattern 9 can be simultaneously formed with one shaping plate. The simultaneous formation thereof can make the recess and projection design 8 and the gloss design coincide with each other. Thus, the decorative sheet 10 can be provided which has the three-dimensional effect by a tactile sense and the visual three-dimensional effect or texture and excellent in the design properties.

Furthermore, by suppressing the deviation between the recess and projection design 8 and the recess and projection pattern 9, and the image of the image design layer 2 within the fixed range, the decorative sheet 10 can be provided in which the shapes and the distributions of the pattern can be equally made to coincide with each other with good accuracy on the entire sheet. The deviation range of the recess and projection design 8 and the recess and projection pattern 9, and the image of the image design layer 2 can be held in a range where the design is not impaired focusing on differences in the visible distance and the ease of visual recognition of the image, the recess and projection design, and the gloss design depending on the light reflection angle in the use of the decorative sheet 10 for building interior/exterior decoration/fittings. This can make the image by the image design layer and the three-dimensional effect or texture by the three-dimensional effect and the gloss by the recess and projection design coincide with each other, so that the decorative sheet 10 more excellent in the design properties can be provided.

(2) In the decorative sheet 10 according to this embodiment, the height difference between the recess portions and the projection portions in each of the regions 9a, 9b, 9c was set to 0.5 μm or more and 10 μm or less. Hence, the gloss inside the regions 9a, 9b, 9c can be increased, and thus the gloss contrast between the outside and the inside of the regions 9a, 9b, 9c can be enhanced, so that the decorative sheet 10 which is more advantageous as the design can be provided.

(3) The decorative sheet 10 according to this embodiment is configured so that the surface protective layer 5 (first surface protective layer 5a, second surface protective layer 5b) contains at least one of the thermosetting resin having a urethane bond and the ionizing radiation curable resin. Hence, the decorative sheet 10 excellent in the adhesiveness to the transparent thermoplastic resin layer 4, the deformation followability of the decorative sheet 10, the abrasion resistance, and the like can be provided.

(4) In the decorative sheet 10 according to this embodiment, the difference between the gloss inside the regions 9a, 9b, 9c and the gloss outside the regions 9a, 9b, 9c is set to 3 or more and 30 or less in terms of the 60° specular gloss based on JIS Z 8741. Hence, the gloss contrast between the inside and the outside of the regions 9a, 9b, 9c can be certainly enhanced, so that the decorative sheet 10 which is more advantageous as the design can be provided.

EXAMPLES

Hereinafter, Examples and Comparative Example according to the embodiment of the present invention are described. The present invention is not limited to Examples described below.

Example 1

First, as illustrated in FIG. 1, a 0.06 mm thick colored polypropylene sheet was prepared as the base material 1. Then, the image design layer 2 was formed by printing on the front surface 1a side of the base material 1. As a printing ink, an ink containing urethane/vinyl chloride acetate-based resin (Toyo Ink, Inc.) was used. Then, the transparent thermoplastic resin layer 4 was laminated on the front surface 2a side of the formed image design layer 2 through the transparent adhesive layer 3. As the transparent adhesive layer 3, 8 g/m$^2$ of a urethane-based dry laminating adhesive (Toyo-Morton, Ltd.) was used. As the transparent thermoplastic resin layer 4, a transparent polypropylene sheet was used. Then, a two-component curable urethane resin was applied to the back surface 1b side of the base material 1 to form the back surface resin coat layer 7 (primer). Then, the front surface of the transparent thermoplastic resin layer 4 was shaped using a shaping plate (embossing plate). As the shaping plate, a plate was used which sets the height difference between the recess portions and the projection portions of the recess and projection design 8 to 3 μm and sets the height difference between the recess portions and the projection portions in each of the regions 9a, 9b, 9c to 0.5 μm. Then, 3 g/m$^2$ of a two-component curable urethane resin into which 25 parts by mass of a silica filler having an average particle diameter of 2 μm or more and 3 μm or less was mixed was applied to the front surface 4a side of the transparent thermoplastic resin layer 4 to form the first surface protective layer 5a and the second surface protective layer 5b.

Example 2

In Example 2, the height difference between the recess portions and the projection portions of each of the regions 9a, 9b, 9c was set to 2 μm, i.e., larger than 0.5 μm which was the height difference of Example 1. The decorative sheet 10 was produced with the same materials and by the same procedure as those of Example 1, except the above.

Example 3

In Example 3, the silica filler content in the first surface protective layer 5a was set to 3 parts by mass. The decorative sheet 10 was produced with the same materials and by the same procedure as those of Example 1, except the above.

Comparative Example 1

In Comparative Example 1, the formation of the recess and projection design 8 was omitted. The decorative sheet 10 was produced with the same materials and by the same procedure as those of Example 1, except the above.

Performance Evaluation

The following performance evaluation tests were performed to the decorative sheets 10 of Examples 1 to 3 and Comparative Example 1.

Gloss

In a gloss test, the gloss inside the regions 9a, 9b, 9c and the gloss outside the regions 9a, 9b, 9c (i.e., gloss of the regions 9d) were measured in terms of the 60° specular gloss based on JIS Z 8741.

Tactile Sense

A tactile sense test evaluated a three-dimensional effect by touch feeling. A case where a three-dimensional effect was felt by touch feeling was evaluated to Pass "○". A case where a three-dimensional effect was not felt by touch feeling was evaluated to Fail "x".

Three-Dimensional Effect

A three-dimensional effect test evaluated a three-dimensional effect by visual observation. A case where a three-dimensional effect was felt by visual observation was evaluated to Pass "○". A case where a three-dimensional effect was not felt by visual observation was evaluated to Fail "x".

Test Results

The test results are illustrated in Table 1.

TABLE 1

| Evaluation | Ex. 1 | Ex. 2 | Ex. 3 | Comp. Ex. 1 |
|---|---|---|---|---|
| Gloss (Inside regions, 9a, 9b, 9c) | 26 | 18 | 34 | 28 |
| Gloss (Outside regions, 9a, 9b, 9c) | 17 | 17 | 17 | 17 |
| Tactile sense | ○ | Δ | Δ | x |
| Three-dimensional effect | ○ | Δ | Δ | x |
| Total design | ○ | Δ | Δ | x |

As illustrated in Table 1, in the decorative sheet 10 of Example 1, the gloss contrast between the inside and the outside of the regions 9a, 9b, 9c increased and the test result of the tactile sense and the test result of the three-dimensional effect were Pass "○", and therefore the total design was Pass "○". In particular, the height difference between the recess portions and the projection portions of each of the regions 9a, 9b, 9c was 0.5 μm, and therefore the gloss of the regions 9a, 9b, 9c increased and a visual three-dimensional effect was reinforced as the gloss contrast was higher. Thus, the decorative sheet 10 which was more advantageous as the design was obtained. In the decorative sheet 10 of Example 2, the height difference between the recess portions and the projection portions of each of the regions 9a, 9b, 9c was made larger than that of the decorative sheet 10 of Example 1, and therefore the shapes of the regions 9a, 9b, 9c were mixed into the shape of the recess and projection design 8, so that it was hard to distinguish the shapes and the regions 9a, 9b, 9c were hard to contribute to an improvement of a design feeling. Thus, the test result of the three-dimensional effect was "Δ" and the total design was Pass "Δ". In the decorative sheet 10 of Example 3, the silica filler content in the first surface protective layer 5a was set to 3 parts by mass, and therefore the test result of the tactile sense and the test result of the three-dimensional effect were "Δ" and the total design was Pass "Δ". On the other hand, in the decorative sheet 10 of Comparative Example 1, the recess and projection design 8 was omitted, and therefore a three-dimensional effect was lost. Thus, the test result of the tactile sense and the test result of the three-dimensional effect were Fail "x" and the total design was Fail "x", so that Comparative Example 1 was inferior to Examples 1 to 3 in terms of the design.

Example 4

In Example 4, the first surface protective layer 5a and the second surface protective layer 5b were coated, and then the recess and projection design 8 and the regions 9a, 9b, 9c were shaped using a shaping plate setting the height difference between the recess portions and the projection portions of the recess and projection design 8 to 200 μm and setting the height difference between the recess portions and the projection portions in each of the regions 9a, 9b, 9c to 10 μm. The decorative sheet 10 was produced with the same materials and by the same procedure as those of Example 1, except the above.

Example 5

In Example 5, the height difference between the recess portions and the projection portions in each of the regions 9a, 9b, 9c was set to 0.5 μm. The decorative sheet 10 was produced with the same materials and by the same procedure as those of Example 4, except the above.

Example 6

In Example 6, the height difference between the recess portions and the projection portions in each of the regions 9a, 9b, 9c was set to 15 μm. The decorative sheet 10 was produced with the same materials and by the same procedure as those of Example 4, except the above.

Performance Evaluation/Test Results

Performance evaluation tests of gloss, a tactile sense, and a three-dimensional effect were performed to the decorative sheets 10 of Examples 4 to 6.

The test results are illustrated in Table 2.

TABLE 2

| Evaluation | Ex. 4 | Ex. 5 | Ex. 6 |
|---|---|---|---|
| Gloss (Inside regions, 9a, 9b, 9c) | 21 | 29 | 8 |
| Gloss (Outside regions, 9a, 9b, 9c) | 5 | 5 | 5 |
| Tactile sense | ⊙ | ⊙ | ○ |
| Three-dimensional effect | Δ | ○ | Δ |
| Total design | ○ | ⊙ | Δ |

As illustrated in Table 2, in the decorative sheets 10 of Examples 4 to 6, the height difference between the recess portions and the projection portions of the recess and projection design 8 was set to 200 μm, and therefore the decorative sheets 10 excellent in a tactile sense were obtained and the test results of the tactile sense were Pass "⊙" or "○". In the decorative sheet 10 of Example 5, the height difference between the recess portions and the projection portions in each of the regions 9a, 9b, 9c was set to 0.5 μm, and therefore the gloss contrast between the inside and the outside of the regions 9a, 9b, 9c increased and a visual three-dimensional effect was reinforced. Thus, the decorative sheet 10 which was more advantageous as the design was obtained and the test result of the three-dimensional effect was "⊚". On the other hand, in the decorative sheet 10 of Example 6, the height difference between the recess portions and the projection portions in each of the regions 9a, 9b, 9c was set to 15 μm, and therefore a gloss contrast can be given to the inside and the outside of the regions 9a, 9b, 9c. However, the shapes of the regions 9a, 9b, 9c were mixed into the shape of the recess and projection design 8, so that it was hard to distinguish the shapes and the regions 9a, 9b, 9c were hard to contribute to an improvement of a design feeling. Thus, the test result of the three-dimensional effect by visual observation was "A".

Example 7

In Example 7, the first surface protective layer 5a and the second surface protective layer 5b were formed of an acrylic UV-curable resin. The decorative sheet 10 was produced with the same materials and by the same procedure as those of Example 1, except the above.

Performance Evaluation

The following performance evaluation tests were performed to decorative plates obtained by bonding the decorative sheets 10 of Examples 1 and 7 to a 3 mm thick MDF plate using a two-component curable emulsion adhesive (Konishi Co., Ltd.).

Pencil Hardness Test

In a pencil hardness test, a test based on JIS K5600-5-4 Scratch hardness (pencil method) was performed. More specifically, pencils with hardnesses of 3B, 2B, B, HB, F, H, 2H, and 3H were used, the angle of the pencils to the decorative sheets 10 was fixed to 45±1°, and then it was observed whether a dent (scratch) was formed in the decorative sheets 10 (surface protective layers 5) by sliding the pencils in a state of applying a 1 kg load thereto. Then, the maximum hardness of the pencils by which no dents were confirmed was obtained as the test result.

Even when a test based on ISO 3270 was performed, the same results as those in the case of JIS K5600-5-4 described above were obtained. Moreover, even when a test based on ISO 2808 was performed, the same results as those in the case of JIS K5600-5-4 were obtained.

1 mmR Bending Test

In a 1 mmR bending test, 1 mmR bending was performed to the decorative plates, and then it was observed whether a crack or whitening occurred. Then, a case where neither a crack nor whitening was confirmed was evaluated to Pass "○". A case where either a crack or whitening was confirmed was evaluated to Fail "x".

"1 mmR" means that the radius (R) is 1 mm.

Test Results

The test results are illustrated in Table 3.

TABLE 3

| Evaluation | Ex. 1 | Ex. 7 |
| --- | --- | --- |
| Pencil hardness test | 4B | F |
| 1 mmR bending test | ○ | x |

As illustrated in Table 3, the decorative sheet 10 of Example 1 was configured so that the first surface protective layer 5a and the second surface protective layer 5b were formed of the two-component curable urethane resin, and therefore the test result of the pencil hardness test was "4B", which showed that the hardness was equal to or higher than the passing line but the abrasion resistance was not particularly excellent. However, in the 1 mmR bending test, the occurrence of a crack or whitening in a corner was not caused, and thus the test result was Pass "○" and the bending suitability was good.

On the other hand, the decorative sheet 10 of Example 7 was configured so that the first surface protective layer 5a and the second surface protective layer 5b were formed of the acrylic UV-curable resin, and therefore the test result of the pencil hardness test was "F", so that the decorative sheet 10 having excellent abrasion resistance was obtained. However, in the 1 mmR bending test, a crack occurred and a corner was whitened, and thus the test result was Fail "x" and the bending suitability was inferior to that of the decorative sheet 10 (Pass "○") of Example 1.

REFERENCE SIGNS LIST 1 base material
1a front surface
1b back surface
2 image design layer
2a front surface
3 transparent adhesive layer
3a front surface
4 transparent thermoplastic resin layer
4a front surface
5 surface protective layer
5a first surface protective layer
5b second surface protective layer
5c front surface
7 back resin coat layer
8 recess and projection design
9 recess and projection pattern
9a, 9b, 9c region where recesses and projections are formed
9d region where recesses and projections are not formed
10 decorative sheet

The invention claimed is:

1. A decorative sheet comprising:
a base material;
an image design layer provided on a front surface side of the base material;
a transparent adhesive layer provided on a front surface side of the image design layer;
a transparent thermoplastic resin layer provided on a front surface side of the transparent adhesive layer, and
a surface protective layer provided on a front surface side of the transparent thermoplastic resin layer, wherein
on the front surface side of the transparent thermoplastic resin layer and a front surface side of the surface protective layer, a recess and projection design and a recess and projection pattern having a plurality of regions provided on each of a surface of a recess portion and a surface of a projection portion of the recess and projection design and in which a projection and a recess are formed are provided,
the recess and projection pattern includes as the plurality of regions in which the projection and the recess are provided, a first region formed on the surfaces of the projection portions of the recess and projection design, a second region formed on the surfaces of the recess portions of the recess and projection design, a third region formed ranging across the surfaces of the recess portions and the surfaces of the projection portions of the recess and projection design, and a fourth region having no recesses and projection, a height difference between the recess portion and the projection portion of the recess and projection design is 3 µm or more and 200 µm or less, and a height difference between a recess portion and a projection portion in each of the regions of the recess and projection pattern is smaller than the height difference between the recess portion and the projection portion of the recess and projection design.

2. The decorative sheet according to claim 1, wherein the height difference between the recess portion and the projection portion in each of the regions is 0.5 µm or more and 10 µm or less.

3. The decorative sheet according to claim 1, wherein the surface protective layer contains at least one of a thermosetting resin having a urethane bond and an ionizing radiation curable resin.

4. The decorative sheet according to claim 1, wherein a difference between gloss inside the region and gloss outside the region is 3 or more and 30 or less in terms of 60° specular gloss based on JIS Z 8741.

5. The decorative sheet according to claim 2, wherein the surface protective layer contains at least one of a thermosetting resin having a urethane bond and an ionizing radiation curable resin.

6. The decorative sheet according to claim 2, wherein a difference between gloss inside the region and gloss outside the region is 3 or more and 30 or less in terms of 60° specular gloss based on JIS Z 8741.

7. The decorative sheet according to claim 3, wherein a difference between gloss inside the region and gloss outside the region is 3 or more and 30 or less in terms of 60° specular gloss based on JIS Z 8741.

* * * * *